May 4, 1926.
B. G. KLUGH
1,583,054
PROCESS FOR THE PRODUCTION OF SUPERPHOSPHATES
Filed Dec. 7, 1920
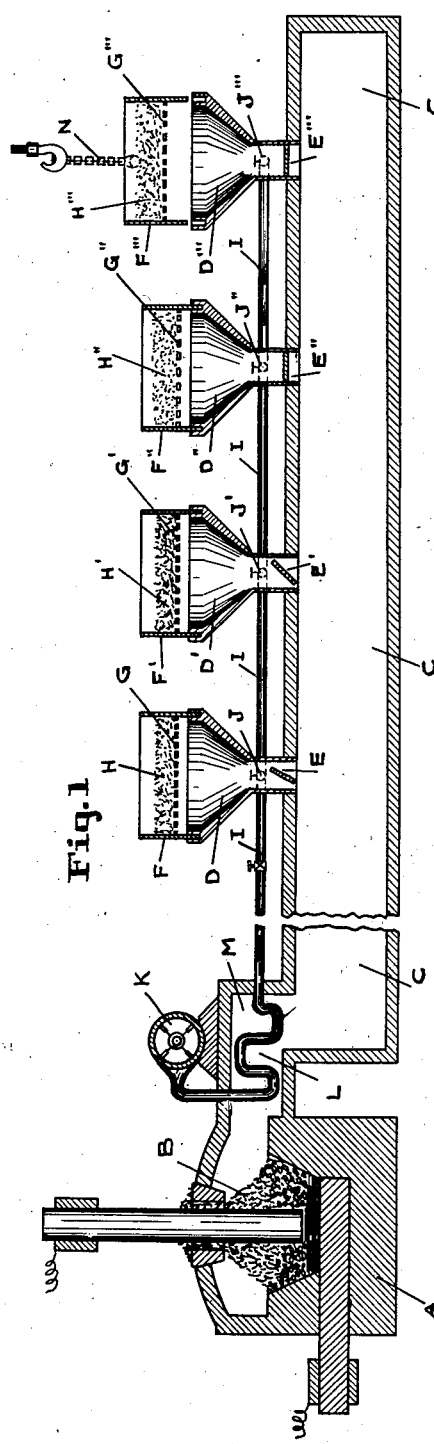
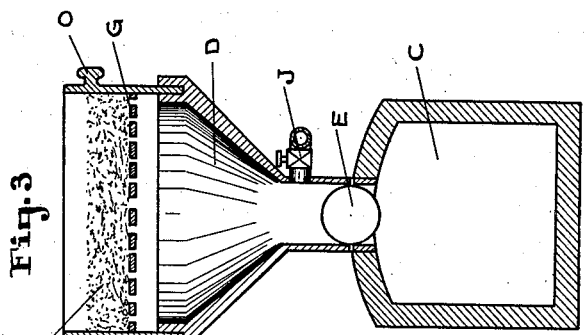
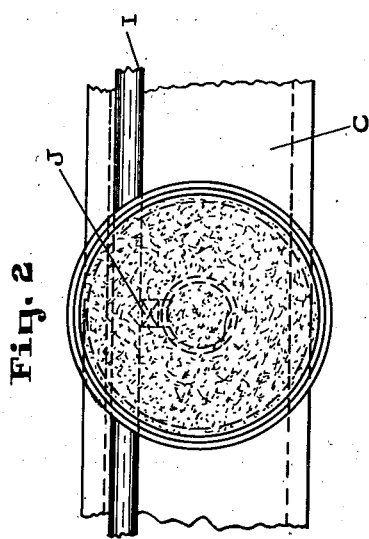
INVENTOR
B. G. Klugh.
BY
ATTORNEY Patented May 4, 1926.

1,583,054

UNITED STATES PATENT OFFICE.

BETHUNE G. KLUGH, OF ANNISTON, ALABAMA, ASSIGNOR TO FEDERAL PHOSPHORUS COMPANY, OF BIRMINGHAM, ALABAMA, A CORPORATION OF ALABAMA.

PROCESS FOR THE PRODUCTION OF SUPERPHOSPHATES.

Application filed December 7, 1920. Serial No. 429,019.

*To all whom it may concern:*

Be it known that I, BETHUNE G. KLUGH, a citizen of the United States of America, residing at Anniston, in the county of Calhoun and State of Alabama, have invented certain new and useful Improvements in Processes for the Production of Superphosphates, of which the following is a specification.

This invention relates to the production of monocalcic phosphate, and more particularly to the production of the high grade fertilizer material generally known as double super-phosphates by a direct and greatly simplified process over those in use.

It has for its object the production of said double super-phosphates with the elimination of many steps as now practiced and therefore at greatly reduced cost.

In the processes now in use for the production of this material phosphoric acid is added to finely ground phosphate rock.

The chemical reaction involved is

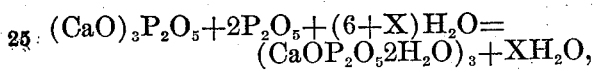

where X is the quantity of water diluting the added phosphoric acid. In order to mix the phosphoric acid thoroughly with the ground phosphate rock and to secure the necessary intimacy of contact of the reacting bodies, a certain amount of water for dilution is necessary. The resultant product of such primary mixing is a wet and incompletely reacted mass. It is necessary that the mixture set about thirty days after mixing in order that the reaction be complete and practically all the tricalcic and dicalcic phosphate be converted into monocalcic phosphate. It is then necessary to dry and grind the mass to make it marketable. The drying will not occur when stored at atmospheric temperature since no dehydrating agents exist in the mixture.

Prior to the above described mixing procedure in the existing processes for the manufacture of double super-phosphate the phosphoric acid used is that produced by two processes:—

(a) That by treating phosphate rock with sulphuric acid and the separation of the calcium sulphate by countercurrent decantation and settling processes which involves the expense of the sulphuric acid as well as the expense of processing.

(b) That by the electrical smelting of phosphatic materials with a carbonaceous reducing agent and silicious flux the oxidation of the evolved phosphorus to phosphorus pentoxide and the subsequent hydration and collection of the phosphoric acid by either electrical precipitation or absorption tower methods.

In either case of production of the phosphoric acid used the attendant collection, mixing and interest on cost of materials and investment during the period of delay of reaction is very great.

In my hereindescribed invention, I propose to utilize the electrical smelting method in the production of the $P_2O_5$, but to eliminate the step of collection of the acid as such as well as that of the mixing, and furthermore to cause the reaction to be completed and the product to be ready for the market in a few hours instead of thirty days or more.

The principle upon which my invention is based lies in the discovery that the $P_2O_5$ as resulting from the smelting of phosphate rock, carbon, and silica, and the oxidation of the elemental phosphorus to $P_2O_5$ within the gases as emanating from said smelting operation, exists in a fume state and is chemically inert as an acid. Even strong alkalies, such as potash (KOH) and soda NaOH, are very slightly acted upon, however intimate the contact of the $P_2O_5$ or phosphoric oxide fume bearing gases and the bodies upon which $P_2O_5$ or phosphoric acid is normally active. However I have further discovered that if the phosphoric oxide fume bearing gases, as emanating from the furnace, be passed through a filter bed of solid granular material in which the area of contact of the solid particles forming the filter bed is very great, the $P_2O_5$ or phosphoric acid will be deposited in the filter bed and it will furthermore immediately become chemically active as soon as separated from the gases and in a quiescent state as cohering to all possible surfaces on the filter bed material particles. Furthermore, the $P_2O_5$ or phosphoric acid as carried in the stream of gases, in its fume state, is in a vastly more finely divided state than is possible to obtain from a liquid state, since the agglomerate particles of liquid is of limited divisibility. Furthermore about the highest attainable concentration in the phosphoric acid or $P_2O_5$ bearing gases from the electrical smelting of phosphatic materials is about one pound of $P_2O_5$ to 250 cubic feet of the gases. The $P_2O_5$ or phosphoric acid being in the infinitely divided fume state will be distributed uniformly throughout the mass and in contact with all the particles of the granular filter bed. Based upon the above described properties of the $P_2O_5$ or phosphoric acid in the fume state in the stream of gases carrying it, I have developed my present invention which consists in superimposing a filter bed of finely ground phosphate rock upon a grate and passing the current of phosphoric acid or $P_2O_5$ bearing gases therethrough. The said phosphoric acid or oxides will be deposited within the filter bed and the gases pass therethrough. The phosphoric acid or oxides will be deposited from its infinitely divided fume state, hence will be uniformly brought into contact with every particle of the finely ground phosphate rock in the filter bed. The finely ground phosphate rock is slightly moistened to prevent its falling through the grate openings until the stream of gas passage is established. Since the gases will pass through the bed at a temperature about 100° C., the excess moisture in the filter bed, not combined with the $P_2O_5$ to form phosphoric acid, will be evaporated and carried out with the gases while the temperature of the bed will rapidly rise as the filtration and deposition of hte phosphoric acid therein proceeds. The phosphoric acid, or $P_2O_5$, according to whether the $P_2O_5$ has been hydrated, having been deposited upon the surfaces of all the particles of the phosphate rock forming the bed will rapidly assume its normal chemically active state and will hence quickly attack each particle of the phosphate rock with which it is in contact. The reaction will rapidly propagate upwardly through the bed until the phosphoric acid or $P_2O_5$ deposition reaches practically to the top surface of said bed, whereupon the gases are cut off from the filter and switched to another freshly made filter bed of finely divided phosphate rock. The filter bed in which the deposition has just been completed and from which the current of gases has been cut off is then subjected to a stream of heated air passing therethrough. The reaction between the phosphoric acid and phosphate rock produces a somewhat pasty physical state with rise in temperature from the chemical reaction. The current of heated air then passing through the bed under said chemical reaction by its further heating and by the movement it imparts to every reacting particle in the bed accelerates the reaction to completeness at a very rapid rate. The current of heated air through the bed further prevents the agglutinating of small sections of the reacting mass, which tends, in the usually practiced method of mechanically stirring the reacting mass of phosphoric acid and phosphate rock, to prevent complete contact between certain portions of the two reacting bodies, thus retarding the reaction. In the usual procedure of mixing phosphoric acid in a liquid state with finely ground phosphate rock the reaction at first proceeds very rapidly and requires accelerated stirring to even approximately completely mix the two constitutents so as to bring them into intimate contact. Even as best conducted the mass under reaction quickly attains a gummy state and certain small portions of the incompletely converted phosphate are sealed up (as it were) with more plastic portions of the reacting mass and thus fail to come in contact with the required portion of the acid to complete the reaction. In contradistinction to this condition, my process of depositing the phosphorus as an acid from a fume state in the gas current completely and uniformly distributes said acid to all the phosphate rock particles and the following current of heated air through the mass, made pasty by the reaction, performs most efficiently the functions obviously impossible to completely attain where the liquid acid and phosphate rock are mixed. The current of heated air is then continued until the reaction is completed to monocalcic phosphate and thereafter to the complete drying of the mass. Since the stream of heated air continues through the mass from its plastic state to complete dryness, the bed is finished as a very porous mass, consisting of extremely finely divided intercommunicating cells with extremely thin cell walls. It is then discharged from the grate and reduced to the powdered marketable form with very simple and easy grinding.

Having described the principle involved, I will now give a description of the details of the cycle of the process as conducted on a commercial scale.

Referring to the drawings:—

Fig. 1 is a longitudinal sectional elevation of the complete equipment for practicing my invention.

Fig. 2 is a plan view enlarged of one filter; and

Fig. 3 is a vertical cross section of one filter and the gas main.

Similar reference letters refer to similar parts throughout the drawings.

A is the electric furnace in which the phosphate rock, carbon and silicious flux mixture is smelted to evolve elemental phosphorous and carbon monoxide through the top surface of the stock B. The oxidized and hydrated gases are passed out of the furnace into gas main C and having been cooled by any suitable means (not shown) to the desired temperature, are passed out of the main to any of the several filter chambers D, D', D'', D''', selectively by means of valves E, E', E'', E'''. The filter pans F, F', F'', F''' are each provided with a grate G, G', G'', G''', respectively, whose openings communicate with the inside of said respective filter chambers D, D', D'', D''', and upon said respective grates I place the moistened phosphate rock bed shown by H, H', H''. Into each filter chamber the hot air pipe I communicates by means of valves J, J', J'', J''', said hot air pipe being supplied by air under pressure from fan K which forces the air through coils L passing through the highly heated gas chamber M directly from the furnace, and thereby heating the air for subsequent blowing through the filters as hereinabove described, thereby deriving the heat for this step in the process from the waste heat of the furnace gases. In the drawing filters F and F' are shown in service with the gases passing therethrough so as to cause the deposition of the phosphoric acid therefrom. Filter F'' has the phosphoric acid bearing gases closed off and is under air blast, while filter F''' has the phosphoric acid bearing gases closed off and is under process of removal of the filter pan by the engagement of the crane tackle N with trunnion lugs O for discharging the finished product and refilling for further deposition of acid and production of double super-phosphate.

The apparatus hereinabove described fulfills the requirements for the commercial operation of my present process and provides, by the multiplicity of filters and the removable filter pans, for the complete cycle of operations without any break in the essential continuity of the smelting operation.

Another feature of my invention is that monocalcic phosphates may be directly produced as a by-product to metallic phosphide alloys formed by electrically smelting phosphate rock, carbon, silicious material and the metal bearing material in an enclosed furnace, and passing the furnace gases bearing the uncombined liberated phosphorus in fume state through a filter bed of phosphatic material and treating as hereinbefore described.

While my present invention relates to the production of double super-phosphate, it is applicable in its entirety to the production of any phosphates and to the production of any chemicals which involves the reaction of phosphoric acids or oxides with other bodies which exist in a solid state. I therefore desire to claim the novel feature of this process broadly in whatever field they may be applicable and whether the phosphorus collected be in the unhydrated state as an oxide or in the hydrated state as an acid.

Having thus described my invention, what I claim as new and desire to secure by Letters Patent, is:—

1. The hereindescribed process consisting in conducting phosphoric oxide bearing gases through a mass of finely divided materials chemically active to said phosphoric oxide to deposit the phosphoric oxide in the bed, and then passing heated air through said filter bed to accelerate the chemical reaction thereof.

2. The hereindescribed process consisting in conducting phosphoric oxide bearing gases through a mass of finely divided materials chemically active to said phosphoric oxide to deposit the phosphoric oxide in the bed, and then passing heated air through said filter bed to accelerate the chemical reaction thereof and to complete the drying of the product after chemical reaction.

3. The hereindescribed process of producing monocalcic phosphate consisting in depositing phosphoric oxide from a fume state within the interstices of a mass of finely divided phosphate rock in proportionate quantities for the required chemical reactions, and then forcing heated air through said filter bed until the reaction is completed.

4. The hereindescribed process of producing monocalcic phosphate consisting in depositing phosphoric oxide from a fume state within the interstices of a mass of finely divided phosphate rock in proportionate quantities for the required chemical reactions, and then forcing heated air through said filter bed until the reaction is completed and the reacted mass completely dried.

5. The hereindescribed process of producing monocalcic phosphate consisting in depositing phosphoric oxide from a fume state within the interstices of a mass of finely divided phosphate rock in proportionate quantities for the required chemical reactions, and then passing heated air through the bed with such volume and velocity as to accelerate the reaction, dry the product, and simultaneously convert the plastic reacting mass into a cellular physical state.

6. The hereindescribed process of producing monocalcic phosphate consisting in depositing phosphoric oxide from a fume state within the interstices of a mass of finely divided phosphate rock in proportionate quantities for the required chemical reactions, and then passing heated gases through the mass with such volume and velocity as to accelerate the reaction, dry the product, and simultaneously convert the plastic reacting mass into a cellular physical state.

7. A process for the production of monocalcic phosphate, consisting in passing gases bearing phosphoric oxides in fume state through phosphate material, and forcing hot gases through the reacting mass with sufficient velocity to dry it to a cellular mass.

8. A process for the direct production of monocalcic phosphate, which consists in smelting phosphatic material so as to evolve phosphorus oxides in fume state along with furnace gases, passing the gases with said fume through a mass of phosphatic material, utilizing the heat of said gases to preheat air, and forcing said air through the reacting filter bed with sufficient velocity to accelerate the reaction taking place therein and to dry it into a cellular mass.

9. A process for the direct production of monocalcic phosphates as a by-product, which consists in smelting phosphatic material, a silicious flux, carbon and iron to produce ferro-phosphorus, collecting the gases and the phosphorus in fume state which emanate from said furnace, passing said phosphorus bearing gases through a mass of granular phosphatic material to cause the deposit of the phosphorus oxides as phosphoric acid throughout said granular mass, and accelerating the reaction of said mass and drying it by forcing preheated gases therethrough.

10. An apparatus for the direct production of monocalcic phosphates, which comprises a conduit for phosphorus bearing gases, a filter containing granular material chemically active to the phosphorus in said gases, means to pass the gases through said filter, and means to preheat and force air through said filter bed.

11. An apparatus in accordance with claim 10, in which said means for preheating the air comprises pipes passed through said conduit to recuperate heat from said phosphorus bearing gases.

12. In an apparatus for the direct production of monocalcic phosphates comprising a conduit for phosphorus bearing gases, a series of filter beds containing granular phosphatic material, means to selectively pass said gases through said filter beds, an air blower, an air manifold passing through said conduit to recuperate heat from the gases therein, and means to selectively direct said preheated air through said filter beds, substantially as described.

13. An apparatus in accordance with claim 12, in which the filter beds are independently removable and interchangeable.

14. The method of producing calcium acid phosphate which consists in subjecting phosphatic material to the action of phosphorus pentoxide.

15. The method of producing calcium acid phosphate which consists in subjecting phosphatic material in powdered form to the direct action of phosphorus pentoxide.

16. The method of producing calcium acid phosphate which consists in subjecting phosphatic material to the direct action of phosphorus pentoxide produced by the volatilization of phosphoric material.

In testimony whereof I affix my signature.

BETHUNE G. KLUGH.